United States Patent
Yamamori et al.

(10) Patent No.: US 6,846,878 B2
(45) Date of Patent: Jan. 25, 2005

(54) ACRYLIC RESIN AND ANTIFOULING COATING

(75) Inventors: Naoki Yamamori, Kyotanabe (JP); Kiyoaki Higo, Ikoma (JP); Masayuki Matsuda, Osaka (JP)

(73) Assignees: Nippon Paint Co., Ltd., Osaka (JP); Nippon Paint Marine Coatings Co., Ltd., Hyogo (JP)

( * ) Notice: Subject to any disclaimer, the term of this patent is extended or adjusted under 35 U.S.C. 154(b) by 0 days.

(21) Appl. No.: 10/329,605

(22) Filed: Dec. 26, 2002

(65) Prior Publication Data

US 2003/0139558 A1 Jul. 24, 2003

(30) Foreign Application Priority Data

Dec. 26, 2001 (JP) .................................... 2001-395230

(51) Int. Cl.$^7$ .................................................. C08F 30/08
(52) U.S. Cl. ...................... 525/100; 526/279; 526/240; 526/241; 106/15.05
(58) Field of Search ...................... 525/100; 526/279, 526/240, 241; 106/15.05

(56) References Cited

U.S. PATENT DOCUMENTS

| | | | | |
|---|---|---|---|---|
| 4,910,234 A | * | 3/1990 | Yamamori et al. | 424/78.09 |
| 5,767,171 A | * | 6/1998 | Matsubara et al. | 523/122 |
| 5,880,173 A | | 3/1999 | Matsuda et al. | 523/122 |
| 6,123,755 A | * | 9/2000 | Yamamori et al. | 106/15.05 |
| 6,177,530 B1 | * | 1/2001 | Sugihara et al. | 526/241 |
| 6,458,878 B1 | * | 10/2002 | Tsuboi et al. | 524/432 |

FOREIGN PATENT DOCUMENTS

| | | |
|---|---|---|
| EP | 0286 243 | 10/1988 |
| EP | 0471204 | 2/1992 |
| EP | 0802243 | 10/1997 |
| EP | 1016681 | 7/2000 |
| GB | 2257154 | 1/1993 |
| JP | 1-146808 | 6/1989 |
| JP | 3-31372 | 2/1991 |
| JP | 4-264170 | 9/1992 |
| JP | 7-102193 | 4/1995 |
| JP | 11 209658 | 8/1999 |
| JP | 2001-226440 | 8/2001 |
| WO | 91/15546 | 10/1991 |

* cited by examiner

Primary Examiner—Margaret G. Moore
(74) Attorney, Agent, or Firm—Jordan and Hamburg LLP

(57) ABSTRACT

The present invention has for its object to provide an antifouling coating improved in such a manner that the coating film formed therefrom may retain a steady polishing rate over a long period and be not ready to develop cracks and other defects, thus exhibiting a excellent long-term antifouling performance. The composition contains an acrylic resin having at least one group represented by the following general formula (1):

$$-\overset{O}{\underset{\|}{C}}-O-\underset{\underset{R^3}{|}}{\overset{\overset{R^1}{|}}{Si}}-R^2 \quad (1)$$

(wherein $R^1$, $R^2$ and $R^3$ may be the same or different and each represents a hydrocarbon residue of 1 to 20 carbon atoms) in its side chain and additionally at least one group represented by the following general formula (2):

$$-(X)_n-\overset{O}{\underset{\|}{C}}-O-M-A \quad (2)$$

(wherein x is a group represented by the formula:

$$-O-\overset{O}{\underset{\|}{C}}-Y-$$

n is equal to 0 or 1; Y represents a hydrocarbon; M represents a divalent metal; and A represents a monobasic organic acid residue) in its side chain.

7 Claims, No Drawings

ACRYLIC RESIN AND ANTIFOULING COATING

FIELD OF THE INVENTION

The present invention relates to an acrylic resin and an antifouling coating comprising it.

PRIOR ART

Ships, fishnets and other underwater structures are liable to attract marine creatures such as barnacles mussels, and algae, whereby ships, for instance, are prevented from efficient navigation and suffer from other troubles such as a waste of fuel, or fishnets suffer from clogging and shorten serviceable lives. For preventing attachment of creatures to such underwater structures, it is common practice to coat an antifouling coating to the surfaces of the underwater structures.

Among various antifouling coatings, hydrolyzable antifouling coatings are broadly used of late in view of their advantage that the antifouling performance can be sustained for long periods of time. More recently, such coatings comprised triorganosilyl group-containing resins have been developed (Japanese Kokai Publication Hei-146808, Japanese Kokai Publication Hei-31372, Japanese Kokai Publication Hei-264170, Japanese Kokai Publication Hei-07-102193, etc.). However, coating films obtainable from coatings comprised triorganosilyl group-containing resins are generally ready to develop cracks or peeling and have too fast dissolution rates.

Japanese Kokai Publication 2001-226440 discloses a coating composition comprising a copolymer containing tri-i-propylsilyl (meth)acrylate, methoxyethyl acrylate, and other polymerizable monomer or monomers and an antifoulant. The rationale of this composition is that through the use of a defined triorganosilyl (meth)acrylate one may seek an improvement in shelf-life and insure that even the coating film formed from the stored coating may have both the required flexibility and long-term antifouling performance.

Meanwhile, any coating containing triorganosilyl groups that is in use today is disadvantageous in that the coating film formed therefrom dissolves out generally during a certain period of time to lose its antifouling performance, thus calling for recoating to regenerate the necessary antifouling performance. To obviate such troubles, it is desirable to prolong the service life of the coating film and accordingly there is a great demand for a longer-acting antifouling coating. In order that such a longer-acting antifouling coating may be provided, it seems to be a logical measure to improve properties of the coating film in such a manner that it may maintain a constant polishing rate in water over an extended time period and be less ready to develop cracks and other defects.

SUMMARY OF THE INVENTION

In view of the above state of the art, the present invention has for its object to provide an antifouling coating improved in such a manner that the coating film formed therefrom may retain a steady polishing rate over a long time period and be not ready to develop cracks and other defects, thus exhibiting a excellent long-term antifouling performance.

The present invention relates to an acrylic resin having at least one group represented by the following general formula (1):

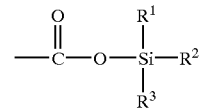

(wherein $R^1$, $R^2$ and $R^3$ are the same or different and each represents a hydrocarbon residue of 1 to 20 carbon atoms) in its side chain and further having at least one group represented by the following general formula (2):

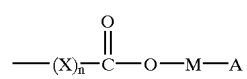

(wherein X is a group represented by the formula:

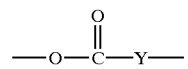

n is equal to 0 or 1; Y represents a hydrocarbon residue; M represents a divalent metal; and A represents a monobasic organic acid residue) in its side chain.

The present invention further relates to an acrylic resin obtainable by (A) a step which comprises polymerizing 3 to 50 weight % of a polymerizable unsaturated organic acid, 90 to 5 weight % of a triorganosilyl (meth)acrylate represented by the following general formula (3):

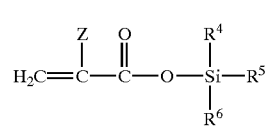

(wherein Z represents a hydrogen atom or a methyl group; $R^4$, $R^5$ and $R^6$ are the same or different and each represents a hydrocarbon residue of 1 to 20 carbon atoms) and one or more other copolymerizable unsaturated monomers and (B) a step which comprises reacting the resin obtained in the above step (A), a metal compound, and a monobasic acid.

The monobasic acid mentioned just above is preferably a monobasic cyclic organic acid.

Preferably said monobasic acid is at least one member selected from the group consisting of rosin, hydrogenated rosin, disproportionated rosin, naphthenic acid, abietic acid, hydrogenated abietic acid, and dehydroabietic acid.

Referring to the above general formula (1), it is preferable that $R^1$, $R^2$ and $R^3$ each be an isopropyl group.

Referring to the above general formula (3), it is preferable that $R^4$, $R^5$ and $R^6$ each be an isopropyl group.

The present invention further relates to an antifouling coating comprising the acrylic resin defined above.

The present invention is now described in detail.

DETAILED DISCRIPTION OF THE INVENTION

The acrylic resin according to the first aspect of the invention has at least one group represented by the above general formula (1) in a side chain of the resin and has at least one group represented by the above general formula (2). Whereas the coating film formed from an antifouling coating comprising a resin having only triorganosilyl groups dissolves out in a certain period of time to cause troubles such as early loss of its antifouling performance, the acrylic resin according to the invention which contains not only at least one group represented by the above general formula (1) but also at least one group represented by the above general formula (2) is free from such disadvantages. Thus, the coating film available from an antifouling coating comprising the acrylic resin of the invention maintains a steady polishing rate in water over a protracted period of time and exhibits an excellent long-term antifouling performance.

Thus, unlike the coating film obtainable from a coating comprising the acrylic resin of the invention, the coating film obtainable from a coating comprising a resin having only the group represented by the above general formula (1) in its side chain and a resin having only a trialkylsilyl group cannot maintain a steady polishing rate in water for a sufficiently long time. In other words, the coating film obtainable from an antifouling coating comprising the acrylic resin of the invention provides an effect which cannot be easily obtained with an antifouling coating comprising a mere blend of the resin having only the group represented by the above general formula (1) and the resin having only a trialkylsilyl group.

Referring to the above general formula (1), $R^1$, $R^2$ and $R^3$ are the same or different and each represents a hydrocarbon residue of 1 to 20 carbon atoms, for example straight-chain or branched-chain alkyl groups, such as methyl, ethyl, propyl, isopropyl, n-butyl, isobutyl, sec-butyl, tert-butyl, pentyl, hexyl, heptyl, octyl, nonyl, decyl, undecyl, dodecyl, tridecyl, tetradecyl, etc; cyclic alkyl groups such as cyclohexyl, substituted cyclohexyl, etc.; and aryl groups and substituted aryl groups. As the substituted aryl group referred to above, there can be mentioned substituted aryl groups as substituted by halogen, alkyl up to about 18 carbon atoms, acyl, nitro, amino or the like. Among these, isopropyl group is preferred in that it provides for a steady polishing rate and a long-term stable antifouling performance.

It is more preferable that, in the above general formula (1), all of $R^1$, $R^2$ and $R^3$ represent isopropyl group. In this case, the coating film shows a steadier polishing rate and a long-term stable antifouling performance.

Referring to the above general formula (2), M represents a divalent metal, which includes but is not limited to the elements belonging to 3A to 7A, 8, and 1B to 7B groups of the periodic table of the elements. Among these, copper and zinc are preferred.

The above divalent metal (M) preferably occurs in a proportion of 0.3 weight % at a minimum to 20 weight % at a maximum in the nonvolatile fraction of said acrylic resin. If the proportion is less than 0.3 weight %, the hydrolysis of the metal salt moiety in the resin results only in very slow rate of elution. On the other hand, if it exceeds 20 weight %, the rate of coating film elution will be too fast. Thus, neither of the cases is acceptable. The more preferred proportion is 0.5 weight % at a minimum to 15 weight % at a maximum.

Referring, further, to the above general formula (2), A represents a monobasic organic acid residue, and this monobasic acid may for example be a monobasic cyclic organic acid.

The monobasic cyclic organic acid mentioned just above is not particularly restricted but includes cycloalkyl group-containing acids, e.g. naphthenic acid, and resin acids such as tricyclic resin acids, inclusive of their salts.

The tricyclic resin acids mentioned just above are not particularly restricted but include monobasic acids having a diterpenoid hydrocarbon skeleton. Thus, for example, compounds having an abietane, pimarane, isopimarane, or rabdane nucleus; specifically abietic acid, neoabietic acid, dehydroabietic acid, hydrogenated abietic acid, parastric acid, pimaric acid, isopimaric acid, levopimaric acid, dextropimaric acid, and sandaracopimaric acid, etc. can be mentioned. Among these, abietic acid and hydrogenated abietic acid, inclusive of their salts, are preferred partly because it is conducive to adequate hydrolysis providing for a excellent long-term antifouling performance and high crack resistance of the obtained coating film and partly from availability points of view.

The monobasic cyclic organic acid mentioned above need not have been highly purified but, for example, pine rosin, pine rhodinic acid and the like can be employed. As specific examples, rosins, hydrogenated rosins, and disproportionated rosins can be mentioned. The rosins mentioned here include gum rosins, wood rosins, and tall-oil rosins and so forth. Rosins, hydrogenated rosins, and disproportionated rosins are preferred because they are not only readily available at low cost and easy to handle but also contribute to a long-term antifouling performance. These monobasic cyclic organic acids can be used each independently or in a combination of two or more species.

Among monobasic acids which can be used in the practice of the invention, those other than said monobasic cyclic organic acids are monobasic acids containing 1 to 20 carbon atoms such as acetic acid, propionic acid, butyric acid, lauric acid, stearic acid, linoleic acid, oleic acid, chloroacetic acid, fluoroacetic acid, valeric acid, and so forth. These monobasic acids can be used each independently or in a combination of two or more species.

Of the monobasic organic acid residue defined in the above general formula (2), said cyclic organic acid preferably accounts for 5 mol % at a minimum through 100 mol % at a maximum. The more preferred proportion is 15 mol % through 100 mol % and the still more preferred proportion is 25 mol % through 100 mol %. If it is less than 5 mol %, the long-term antifouling performance and crack resistance of the coating film may not be reconciled.

The acid value of the monobasic cyclic organic acid to be used for introducing said monobasic cyclic organic acid residue is 100 mg KOH/g at a minimum through 220 mg KOH/g at a maximum, preferably 120 mg KOH/g through 190 mg KOH/g. Within this range, the hydrolysis of the acrylic resin proceeds at an appropriate rate so that a steady polishing rate can be maintained to insure a long-term antifouling performance over a protracted time. The still more preferred range is 140 mg KOH/g at a minimum through 185 mg KOH/g at a maximum.

Referring, further, to the above general formula (2), Y is not particularly restricted provided that it is a hydrocarbon residue. For example, there can be mentioned the residue available upon addition of a dibasic acid, such as phthalic acid, succinic acid, maleic acid, or the like, to a polymerizable unsaturated organic acid monomer. Thus, Y can be introduced by adding a dibasic acid to an unsaturated monobasic acid hydroxyalkyl ester and copolymerizing them to give a resin or alternatively by causing said dibasic acid to be present in the resin production system or after production thereof. In this case, n=1.

The acrylic resin according to the second aspect of the present invention is obtained by a process comprising of (A) a first step which comprises polymerizing 3 to 50 weight % of a polymerizable unsaturated organic acid, 90 to 5 weight % of a triorganosilyl (meth)acrylate represented by the above general formula (3), and one or more other copolymerizable unsaturated monomers and (B) a second step which comprises reacting the resin obtained in said first step, a metal compound, and a monobasic acid.

The first step mentioned above is step (A) in which 3 to 50 weight % of a polymerizable unsaturated organic acid, 90 to 5 weight % of a triorganosilyl (meth)acrylate of the above general formula (3), and one or more other copolymerizable unsaturated monomers are copolymerized.

The polymerizable unsaturated organic acid mentioned above is not particularly restricted but includes organic acids having at least one carboxyl group. As such acids, there can be mentioned unsaturated monobasic acids such as (meth)acrylic acid etc.; unsaturated dibasic acids inclusive of their monoalkyl esters, such as maleic acid and its monoalkyl esters, itaconic acid and its monoalkyl esters, etc.; adducts of dibasic acids to unsaturated monobasic acid hydroxyalkyl esters, such as 2-hydroxyethyl (meth)acrylate-maleic acid adduct, 2-hydroxyethyl (meth)acrylate-phthalic acid adduct, 2-hydroxyethyl (meth)acrylate-succinic acid adduct, and so on. These polymerizable unsaturated organic acids can be used each independently or in a combination of two or more species.

The polymerizable unsaturated organic acid referred to above should occur in a proportion of 3 weight % at a minimum through 50 weight % at a maximum based on 100 weight % of the total monomeric component to be used for the polymerization reaction in the first step. If its proportion is less than 3 weight %, the coating film tends to be poor in softness and flexibility. If it exceeds 50 weight %, the antifouling performance may not be sustained for a sufficiently long time.

Referring to the triorganosilyl (meth)acrylate represented by the above general formula (3), Z represents a hydrogen atom or a methyl group.

$R^4$, $R^5$ and $R^6$ may be the same or different and each represents a hydrocarbon residue containing 1–20 carbon atoms, which includes the same hydrocarbon residues as mentioned above for $R^1$, $R^2$ and $R^3$.

More preferably, $R^4$, $R^5$ and $R^6$ in the general formula (3) are all isopropyl groups. In this case, the polishing rate of the coating film becomes steadier to insure a long-term stable antifouling performance.

The triorganosilyl (meth)acrylate represented by the above general formula (3) is not particularly restricted but includes trimethylsilyl (meth)acrylate, triethylsilyl (meth)acrylate, tri-n-propylsilyl (meth)acrylate, tri-i-propylsilyl (meth)acrylate, tri-n-butylsilyl (meth)acrylate, tri-i-butylsilyl (meth)acrylate, tri-s-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, and tribenzylsilyl (meth)acrylate, among others.

As further examples of the triorganosilyl (meth)acrylate represented by the above general formula (3), there can be mentioned ethyldimethylsilyl (meth)acrylate, n-butyldimethylsilyl (meth)acrylate, di-i-propyl-n-butylsilyl (meth)acrylate, n-octyldi-n-butylsilyl (meth)acrylate, di-i-propylstearylsilyl (meth)acrylate, dicyclohexylphenylsilyl (meth)acrylate, t-butyldiphenylsilyl (meth)acrylate, lauryldiphenylsilyl (meth)acrylate, and t-butyl-m-nitrophenylmethylsilyl (meth)acrylate, and so on. Among these, tri-i-propylsilyl (meth)acrylate is preferred from the standpoint of a long-term steady polishing rate. These triorganosilyl (meth)acrylates can be used each independently or in a combination of two or more species.

The triorganosilyl (meth)acrylate according to the above general formula (3) should occur in a proportion of 90 weight % at a maximum through 5 weight % at a minimum based on 100 weight % of the total monomeric component to be used for the polymerizaiton in the first step. If it exceeds 90 weight %, the coating film will be liable to undergo peeling. If it is less than 5 weight %, the population of triorganosilyl groups in the resin will be too small to insure a long-term antifouling performance. The preferred proportion is 70 weight % at a maximum through 10 weight % at a minimum.

The other copolymerizable unsaturated monomer or monomers mentioned above are not particularly restricted but include (meth)acrylic acid alkyl esters containing 1 to 20 carbon atoms in the ester moiety, such as methyl (meth)acrylate, ethyl (meth)acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, etc.; hydroxyl group-containing (meth)acrylic acid alkyl esters containing 1 to 20 carbon atoms in the ester moiety, such as 2-hydroxypropyl (meth)acrylate, 2-hydroxyethyl (meth)acrylate, etc.; (meth)acrylic acid cyclic hydrocarbon esters, such as phenyl (meth)acrylate, cyclohexyl (meth)acrylate, etc.; polyalkylene glycol esters of (meth)acrylic acid, such as polyethylene glycol mono(meth)acrylate, polyethylene glycol (degree of polymerization: 2 to 10) mono(meth)acrylate, etc.; $C_{1-3}$ alkoxyalkyl (meth)acrylates, (meth)acrylamide; vinyl compounds such as styrene, α-methylstyrene, vinyl acetate, vinyl propionate, vinyl benzoate, vinyltoluene, acrylonitrile, etc.; crotonic acid esters; unsaturated dibasic acid diesters such as maleic acid diesters, itaconic acid diesters, and so on. The ester moieties of the above (meth)acrylic acid esters are preferably alkyl groups containing 1–8 carbon atoms, more preferably alkyl groups containing 1–20 carbon atoms. The preferred species are methyl (meth)acrylate, ethyl (meth)acrylate, butyl (meth)acrylate, and cyclohexyl (meth)acrylate. These monomers may be used each independently or in a combination of two or more species.

The polymerization technology for use in said first step is not particularly restricted but may, for example, comprise mixing the monomeric component comprising of said polymerizable unsaturated organic acid, said triorganosilyl (meth)acrylate, and said other copolymerizable monomer or monomers with a polymerization initiator, such as an azo compound or a peroxide, to prepare a mixture solution, dripping it into a solvent, such as xylene, n-butanol, or the like, and causing it to react under heating.

The number average molecular weight of the resin obtained in said first step is not particularly restricted but is preferably 2,000 at a minimum through 100,000 at a maximum, more preferably 3,000 through 40,000. If it is less than 2,000, the coating film-forming property tends to be inadequate. If it exceeds 100,000, the obtainable coating will not only fail to have a practically useful shelf-life but also be unsatisfactory from the standpoint of public hygiene and economics, for it will then require substantial amounts of a solvent for dilution in the field.

The resin obtained in said first step preferably has an acid value of 30 to 300 mg KOH/g. If it is less than 30, the amount of the metal salt to be attached to the side chain will be too small to give a sufficient antifouling performance. If it exceeds 300, the rate of elution will be too high to provide for a long-term antifouling performance.

The second step mentioned above is a step in which the resin obtained in said first step, a metal compound, and a monobasic acid are reacted together. Thus, the acrylic resin obtainable in this second step has at least one side chain represented by the above general formula (2).

The metal compound referred to above is not particularly restricted but includes the oxides, hydroxides, chlorides, sulfides, and basic carbonates of metals. These metal compounds can be used each independently or in a combination of two or more species.

The monobasic acid referred to above is not particularly restricted; thus it includes but is not limited to the acids mentioned hereinbefore.

The method of reacting the resin obtained in the first step with said metal compound and monobasic acid in this second step can be a conventional one but such procedures as heating and agitation are preferably carried out at a temperature below the decomposition temperature of the metal ester.

The acrylic resin of the invention can be obtained not only by the above method but also by the following and other methods.
(1) The method in which the resin obtained by reacting a polymerizable unsaturated organic acid, a triorganosilyl (meth)acrylate of the above general formula (3) and other copolymerizable unsaturated monomer or monomers is reacted with a monobasic acid metal salt or (2) the method which comprises reacting the polymerizable unsaturated organic acid with a metal compound and a monobasic acid or with a monobasic acid metal salt and polymerizing the resulting metal-containing unsaturated monomer with the triorganosilyl (meth)acrylate of the above general formula (3) and other copolymerizable unsaturated monomer or monomers.

Since the acrylic resin obtainable by the above technology has at least one unit each of the side chain derived from the triorganosilyl (meth)acrylate of the above general formula (3) and the side chain represented by the above general formula (2), it is not only free from the defect of the coating film dissolving out in a limited period of time as it is true of the conventional antifouling coating comprising a triorganosilyl group-containing resin but also insures a steady polishing rate without development of coating film cracks, thus providing for a long-term excellent antifouling performance.

The acrylic resin obtainable in the above manner can be supplemented with the conventional additives inclusive of an antifoulant to prepare an antifouling coating. The resulting antifouling coating is a self-polishing hydrolizable antifouling coating.

For adjusting the physical characteristics and consumption speed of the coating film, the antifouling coating according to the present invention may contain one or more other binder resins in addition to said acrylic resin. Such other binder resin or resins are preferably formulated in a weight ratio of [acrylic resin]:[other binder resin or resins]= 100:0~50:50 on a nonvolatile fraction basis. If the proportion of said other binder resin or resins exceeds the above range, a long-term excellent antifouling performance and a sufficient crack resistance of the coating film may not be satisfactorily reconciled.

As said other binder resin or resins, there can be mentioned chlorinated paraffin, poly(vinyl ether), poly (propylene sebacate), partially hydrogenated terphenyl, poly (vinyl acetate), poly(meth)acrylic alkyl esters, polyether polyols, alkyd resins, polyester resins, poly(vinyl chloride), silicone oil, waxes, white petrolatum, liquid paraffin, rosins, hydrogenated rosins, naphthenic acid, and fatty acids and divalent metal salts thereof, among others.

The above antifouling coating may be supplemented with the conventional additives such as antifouling agent, plasticizer, pigment, solvent, and so forth.

The antifouling agent mentioned above is not particularly restricted but the known substances can be employed. For example, inorganic compounds, metal-containing organic compounds, metal-free organic compounds, etc. can be mentioned.

Specifically, the antifouling agent includes but is not limited to copper suboxide, manganese ethylenebis (dithiocarbamate), zinc dimethylcarbamate, 2-methylthio-4-t-butylamino-6-cyclopropylamino-s-triazine, 2,4,6-tetrachloroisophthalonitrile, N,N-dimethyldichlorophenylurea, zinc ethylenebis (dithiocarbamate), copper rhodanide, 4,5-dichloro-2-n-octyl-3(2H)-isothiazolone, N-(fluorodichloromethylthio) phthalimide, N,N'-dimethyl-N'-phenyl(N-fluorodichloromethylthio)sulfamide, 2-pyridinethiol-1-oxide zinc salt and copper salt, tetramethylthiuram disulfide, 2,4,6-trichlorophenylmaleimide, 2,3,5,6-tetrachloro-4-(methylsulfonyl)pyridine, 3-iodo-2-propylbutyl carbamate, iodomethylparatrisulfone, phenyl(bispyridyl)bismuth dichloride, 2-(4-thiazolyl)benzimidazole, triphenylboron pyridine salt, stearylamine-triphenylboron, and laurylamine-triphenylboron. These antifouling agents can be used each independently or in a combination of two or more species.

The level of use of said antifouling agent in the coating is preferably 0.1 weight % at a minimum through 80 weight % at a maximum on a nonvolatile fraction basis. If it is less than 0.1 weight %, the objective antifouling performance may not be expected. If it exceeds 80 weight % the coating film tends to develop defects such as cracks and peeling. The more preferred level of use is 1 weight % at a minimum through 60 weight % at a maximum.

The plasticizer mentioned above includes phthalic ester plasticizers such as dioctyl phthalate, dimethyl phthalate, dicyclohexyl phthalate, etc.; aliphatic dibasic acid ester plasticizers such as isobutyl adipate, dibutyl sebacate, etc.; glycol ester plasticizers such as diethylene glycol dibenzoate, pentaerythritol alkyl esters, etc.; phosphoric ester plasticizers such as trichlene diphosphate, trichloroethyl phosphate, etc.; epoxy plasticizers such as epoxidized soybean oil, epoxidized octyl stearate, etc.; organotin plasticizers such as dioctyltin laurate, dibutyltin laurate, etc.; trioctyl trimellitate, triacetin, and so on. These plasticizers can be used each independently or in a combination of two or more species.

The pigment mentioned above includes extender pigments such as precipitated barium, talc, clay, chalk, silica white, alumina white, bentonite, etc.; and color pigments such as titanium dioxide, zirconium oxide, basic lead sulfate, tin oxide, carbon black, graphite, red iron oxide, chromium yellow, phthalocyanine green, phthalocyanine blue, quinacridones, and so on. These pigments can be used each independently or in a combination of two or more species.

The solvent mentioned above includes hydrocarbons such as toluene, xylene, ethylbenzene, cyclopentane, octane, heptane, cyclohexane, white spirit, etc.; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, diethylene glycol monoethyl ether, etc.; esters such as butyl acetate, propyl acetate, benzyl acetate, ethylene glycol monomethyl ether acetate, ethylene glycol monoethyl ether acetate, etc.; ketones such as ethyl isobutyl ketone, methyl isobutyl ketone, etc.; and alcohols such as n-butanol, propyl alcohol, etc., among others. These solvents can be used each independently or in a combination of two or more species.

As regards other additives, there is no particular restriction. For example, monobasic organic acids such as monobutyl phthalate, monooctyl succinate, etc., camphor, castor oil, etc.; water-binding agents, antisagging agents, antiflooding agents; antisetting agents; and antifoams, among others, can be mentioned.

The antifouling coating according to the present invention may for example be prepared by adding the routine additives, such as said antifouling agent, plasticizer, coating film consumption control agent, pigment, solvent, etc., to the above-described acrylic resin composition of the invention and blending them together by means of a mixer such as a ball mill, pebble mill, roll mill, sand grinding mill or the like.

The above antifouling coating forms a dry film when it is coated on the substrate surface by a conventional technique and the solvent thereof is evaporated off at atmospheric temperature or elevated.

Since the acrylic resin of the invention has at least one group represented by the above general formula (1) and at least one group represented by the above general formula (2), the coating film obtainable from an antifouling coating comprising this acrylic resin shows a steady polishing rate over a protracted time and scarcely develops cracks, with the result that it exhibits a excellent long-term antifouling performance; thus it is free from the problems with the coating film formed from the conventional antifouling coating comprising a triorganosilyl group-containing resin, for example the defect that the conventional coating film exposed to water dissolves out into the water in a certain period of time or develops cracks to lose its antifouling performance and fail to maintain a long-term antifouling performance. Furthermore, since the relation between the duration of exposure of the coating film obtainable with the acrylic resin of the invention to water and the consumption thickness of the coating film is approximately linear, the coating film shows a steady polishing rate sustainedly over time, thus exhibiting an excellent long-term antifouling performance. For these reasons, the antifouling coating containing the acrylic resin of the invention can be applied with advantage to ships, fishnets and other underwater structures.

BEST MODES FOR CARRYING OUT THE INVENTION

The following examples are further illustrative but by no means definitive of the present invention. In the examples, all parts are weight parts unless otherwise indicated.

Preparation of Resin Varnishes

Varnishes A~I were prepared in accordance with the following resin varnish production examples 1~9. The monomers indicated in Table 1 are the following compounds. The Gardner viscosity values (25° C.) of the varnishes A~I so prepared are also shown in Table 1.
EA: Ethyl acrylate
CHMA: Cyclohexyl methacrylate
CHA: Cyclohexyl acrylate
M-90G: Methoxylated polyethylene glycol methacrylate ester (NK Ester M-90G; product of Shin-Nakamura Chemical)
NBA: n-Butyl acrylate
MMA: Methyl methacrylate
AA: Acrylic acid
MAA: Methacrylic acid
TIPSI: Triisopropylsilyl acrylate
TBSI: Tributylsilyl acrylate Resin Varnish Production Example 1

A 4-necked flask equipped with a stirrer, condenser, temperature control, nitrogen gas inlet pipe, and dropping funnel was charged with 64 parts of xylene and 16 parts of n-butanol and the temperature was maintained at 100° C. To this solution was added a mixture of a monomeric component of the formula (weight parts) shown in Table 1 and 3 parts of t-butyl peroxy-2-ethylhexanoate dropwise at a constant rate over 3 hours. After completion of dropwise addition, the mixture was incubated for 30 minutes. Thereafter, a mixture of 16 parts of xylene, 4 parts of n-butanol and 0.2 parts of t-butyl peroxy-2-ethylhexanoate was added dropwise at a constant rate over 30 minutes and, after completion of dropwise addition, the reaction mixture was incubated for 1.5 hours.

Thus obtained was Varnish A having a nonvolatile fraction of 50.2%, a viscosity of 23 poises, and a number average molecular weight of 7,000. The acid value (nonvolatile fraction; the same applies hereinafter) of the resin thus obtained was 250.

Resin Varnish Production Example 2

A reaction vessel similar to the one used in Resin Varnish Production Example 1 was charged with 72 parts of xylene and 18 parts of n-butanol and the charge was maintained at 115° C. To this solution was added a mixture of a monomeric component of the formula (weight parts) shown in Table 1 and 2 parts of t-butyl peroxy-2-ethylhexanoate dropwise at a constant rate over 3 hours. After completion of dropwise addition, the whole mixture was incubated for one hour.

Thus obtained was Varnish B having a nonvolatile fraction of 50.0%, a viscosity of 11 poises, and a number average molecular weight of 5,000. The acid value of the resin thus obtained was 130.

Resin Varnish Production Example 3

A reaction vessel similar to the one used in Resin Varnish Production Example 1 was charged with 64 parts of xylene and 16 parts of n-butanol and the charge was maintained at 110° C. To this solution was added a mixture of a monomeric component of the formula (weight parts) shown in Table 1 and 3 parts of t-butyl peroxy-2-ethylhexanoate dropwise at a constant rate over 3 hours. After completion of dropwise addition, the whole mixture was incubated for one hour.

Thus obtained was Varnish C having a nonvolatile fraction of 49.5%, a viscosity of 7 poises, and a number average molecular weight of 6,500. The acid value of the resin obtained was 150.

Resin Varnish Production Example 4

A reaction vessel similar to the one used in Resin Varnish Production Example 1 was charged with 64 parts of xylene and 16 parts of n-butanol and the charge was maintained at 115° C. To this solution was added a mixture of a monomeric component of the formula (weight parts) shown in Table 1 and 2 parts of t-butyl peroxy-2-ethylhexanoate dropwise at a constant rate over 3 hours. After completion of dropwise addition, the whole mixture was incubated for 30 minutes. Thereafter, a mixture of 16 parts of xylene, 4 parts of n-butanol and 0.2 parts of t-butyl peroxy-2-ethylhexanoate was added dropwise at a constant rate over 30 minutes and, after completion of dropwise addition, the reaction mixture was incubated for 1.5 hours.

Thus obtained was Varnish D having a nonvolatile fraction of 49.6%, a viscosity of 6 poises, and a number average molecular weight of 6,000. The acid value of the resin obtained was 70.

Resin Varnish Production Example 5

A reaction vessel similar to the one used in Resin Varnish Production Example 1 was charged with 64 parts of xylene and 16 parts of n-butanol and the charge was maintained at 105° C. To this solution was added a mixture of a monomeric component of the formula (weight parts) shown in Table 1 and 2 parts of azobisisobutyronitrile dropwise at a constant rate over 3 hours. After completion of dropwise addition, the whole mixture was incubated for 30 minutes. Thereafter, a mixture of 16 parts of xylene, 4 parts of n-butanol and 0.2 parts of azobisisobutyronitrile was added dropwise at a constant rate over 30 minutes and, after completion of dropwise addition, the reaction mixture was incubated for 1.5 hours.

Thus obtained was Varnish E having a nonvolatile fraction of 49.9%, a viscosity of 10 poises, and a number average molecular weight of 6,500. The acid value of the resin obtained was 200.

Resin Varnish Production Example 6

A reaction vessel similar to the one used in Resin Varnish Production Example 1 was charged with 64 parts of xylene and 16 parts of n-butanol and the charge was maintained at 115° C. To this solution was added a mixture of a monomeric component of the formula (weight parts) shown in Table 1 and 2 parts of t-butyl peroxy-2-ethylhexanoate dropwise at a constant rate over 3 hours. After completion of dropwise addition, the whole mixture was incubated for 30 minutes. Thereafter, a mixture of 16 parts of xylene, 4 parts of n-butanol and 0.2 parts of t-butyl peroxy-2-ethylhexanoate was added dropwise at a constant rate over 30 minutes and, after completion of dropwise addition, the reaction mixture was incubated for 1.5 hours.

Thus obtained was Varnish F having a nonvolatile fraction of 50.0%, a viscosity of 25 poises, and a number average molecular weight of 6,000. The acid value of the resin obtained was 130.

Resin Varnish Production Example 7

A reaction vessel similar to the one used in Resin Varnish Production Example 1 was charged with 72 parts of xylene and 18 parts of n-butanol and the charge was maintained at 105° C. To this solution was added a mixture of a monomeric component of the formula (weight parts) shown in Table 1 and 3 parts of azobisisobutyronitrile dropwise at a constant rate over 3 hours and, after completion of dropwise addition, the whole mixture was incubated for 30 minutes. Thereafter, a mixture of 8 parts of xylene, 2 parts of n-butanol and 0.2 parts of azobisisobutyronitrile was added dropwise at a constant rate over 30 minutes and, after completion of dropwise addition, the reaction mixture was incubated for 1.5 hours.

Thus obtained was Varnish G having a nonvolatile fraction of 50.8%, a viscosity of 4 poises, and a number average molecular weight of 6,000. The acid value of the resin obtained was 30.

Resin Varnish Production Example 8

A reaction vessel similar to the one used in Resin Varnish Production Example 1 was charged with 64 parts of xylene and 16 parts of n-butanol and the charge was maintained at 115° C. To this solution was added a mixture of a monomeric component of the formula (weight parts) shown in Table 1 and 3 parts of t-butyl peroxy-2-ethylhexanoate dropwise at a constant rate over 3 hours. After completion of dropwise addition, the whole mixture was incubated for 30 minutes. Thereafter, a mixture of 16 parts of xylene, 4 parts of n-butanol and 0.2 parts of t-butyl peroxy-2-ethylhexanoate was added dropwise at a constant rate over 30 minutes and, after completion of dropwise addition, the reaction mixture was incubated for 1.5 hours.

Thus obtained was Varnish H having a nonvolatile fraction of 49.7%, a viscosity of 9.5 poises, and a number average molecular weight of 6,500. The acid value of the resin obtained was 160.

Resin Varnish Production Example 9

A reaction vessel similar to the one used in Resin Varnish Production Example 1 was charged with 64 parts of xylene and 16 parts of n-butanol and the charge was maintained at 100° C. To this solution was added a mixture of a monomeric component of the formula (weight parts) shown in Table 1 and 2 parts of t-butyl peroxy-2-ethylhexanoate dropwise at a constant rate over 3 hours. After completion of dropwise addition, the whole mixture was incubated for 30 minutes. Thereafter, a mixture of 16 parts of xylene, 4 parts of n-butanol and 0.2 parts of t-butyl peroxy-2-ethylhexanoate was added dropwise at a constant rate over 30 minutes and, after completion of dropwise addition, the reaction mixture was incubated for 1.5 hours. Thus obtained was Varnish I having a nonvolatile fraction of 60.0%, a viscosity of 7 poises, and a number average molecular weight of 8,000.

TABLE 1

| | | Resin Varnish Production Example | | | | | | | | |
|---|---|---|---|---|---|---|---|---|---|---|
| | | 1 | 2 | 3 | 4 | 5 | 6 | 7 | 8 | 9 |
| Resin Varnish | | A | B | C | D | E | F | G | H | I |
| Monomers (weight parts) | EA | 7.42 | 14.18 | — | 26.02 | 12.96 | 48.32 | — | 16.30 | — |
| | CHMA | 30.00 | 15.00 | — | 15.00 | 15.00 | 15.00 | — | 15.00 | — |
| | CHA | — | — | 25.00 | — | — | — | — | 15.00 | — |
| | M-90G | — | 10.00 | 20.00 | 10.00 | 5.00 | 10.00 | — | 20.00 | — |
| | NBA | — | — | 5.70 | — | — | — | — | — | — |
| | MMA | — | — | 10.00 | — | — | — | 26.15 | 11.17 | 35.00 |
| | AA | 32.08 | 8.34 | 19.30 | 8.98 | 12.83 | 16.68 | 3.85 | 10.27 | — |
| | MAA | — | 9.96 | — | — | 15.34 | — | — | 12.26 | — |
| | TIPSI | — | 42.52 | — | 40.00 | 38.87 | 10.00 | 70.00 | — | 65.00 |
| | TBSI | 30.50 | — | 20.00 | — | — | — | — | — | — |
| Acid value | | 250 | 130 | 150 | 70 | 200 | 130 | 30 | 160 | — |
| Nonvolatile fraction (%) | | 50.2 | 50.0 | 49.5 | 49.6 | 49.9 | 50.0 | 50.8 | 49.7 | 60.0 |
| Gardner viscosity (25° C.) | | Z | W–X | U–V | T–U | W | Z–Z1 | O–P | V–W | U–V |

Preparation of Acrylic Resin Varnishes

Using Varnishes A~I obtained in Resin Varnish Production Examples 1~9, Varnishes 1~11 were prepared in accordance with Acrylic Resin Varnish Production Examples 1~11.

Acrylic Resin Varnish Production Example 1

A four-necked flask equipped with a stirrer, nitrogen gas inlet pipe, reflux condenser, decanter, and temperature control was charged with 100 parts of Varnish A, 48.9 parts of zinc acetate, 78.1 parts of hydrogenated rosin (acid value 160), and 60 parts of xylene, and the temperature was increased to the reflux temperature. With the effluent mixture of acetic acid, water and solvent being removed and the corresponding amount of xylene-butanol mixture added, the reaction was continued for 18 hours. The end-point of reaction was determined by quantitating the acetic acid in the effluent solvent.

After cooling, butanol and xylene were added, whereby Varnish 1 having a nonvolatile fraction of 55% was obtained.

Acrylic Resin Varnish Production Example 2

A reaction vessel similar to the one used in Acrylic Resin Varnish Production Example 1 was charged with 100 parts of Varnish B, 24.1 parts of copper acetate, 40.6 parts of hydrogenated rosin (acid value 160), and 60 parts of xylene, and the temperature was increased to the reflux temperature. With the effluent mixture of acetic acid, water and solvent being removed and the corresponding amount of xylene added, the reaction was continued for 18 hours. The end-point of reaction was determined by quantitating the acetic acid in the effluent solvent.

After cooling, butanol and xylene were added, whereby Varnish 2 having a nonvolatile fraction of 50.2% was obtained.

Acrylic Resin Varnish Production Example 3

A reaction vessel similar to the one used in Acrylic Resin Varnish Production Example 1 was charged with 100 parts of Varnish C, 27.8 parts of copper acetate, and 47.0 parts of WW rosin (acid value 160) and the reaction was carried out in otherwise the same manner as in Acryic Resin Varnish Production Example 2 to give Varnish 3 having a nonvolatile fraction of 47.3%.

Acrylic Resin Varnish Production Example 4

A reaction vessel similar to the one used in Acrylic Resin Varnish Production Example 1 was charged with 100 parts of Varnish D, 12.97 parts of copper acetate, and 21.88 parts of hydrogenated rosin (acid value 160), and the reaction was carried out in otherwise the same manner as in Acrylic Resin Varnish Production Example 2 to give Varnish 4 having a nonvolatile fraction of 51.3%.

Acrylic Resin Varnish Production Example 5

A reaction vessel similar to the one used in Acrylic Resin Varnish Production Example 1 was charged with 100 parts of Varnish E, 39.1 parts of zinc acetate, and 62.5 parts of WW rosin (acid value 160), and the reaction was carried out in otherwise the same manner as in Acrylic Resin Varnish Production Example 1 to give Varnish 5 having a nonvolatile fraction of 53.3%.

Acrylic Resin Varnish Production Example 6

A reaction vessel similar to the one used in Acrylic Resin Varnish Production Example 1 was charged with 100 parts of Varnish F, 24.09 parts of copper acetate, and 40.63 parts of hydrogenated rosin (acid value 160), and the reaction was carried out in otherwise the same manner as in Acrylic Resin Varnish Production Example 2 to give Varnish 6 having a nonvolatile fraction of 50.2%.

Acrylic Resin Varnish Production Example 7

A reaction vessel similar to the one used in Acrylic Resin Varnish Production Example 1 was charged with 100 parts of Varnish G, 5.56 parts of copper acetate, and 9.38 parts of hydrogenated rosin (acid value 160), and the reaction was carried out in otherwise the same manner as in Acrylic Resin Varnish Production Example 2 to give Varnish 7 having a nonvolatile fraction of 60.2%.

Acrylic Resin Varnish Production Example 8

A reaction vessel similar to the one used in Acrylic Resin Varnish Production Example 1 was charged with 100 parts of Varnish D, 37.06 parts of copper acetate, and 60.6 parts of naphthenic acid (NA-165, acid value 165, product of Daiwa Yushi Kogyo), and the reaction was carried out in otherwise the same manner as in Acrylic Resin Varnish Production Example 2 to give Varnish 8 having a nonvolatile fraction of 50.6%.

Acrylic Resin Varnish Production Example 9

A reaction vessel similar to the one used in Acrylic Resin Varnish Production Example 1 was charged with 100 parts of Varnish D, 37.06 parts of copper acetate, and 15.0 parts of pivalic acid, and the reaction was carried out in otherwise the same manner as in Acrylic Resin Varnish Production Example 2 to give Varnish 9 having a nonvolatile fraction of 50.6%.

Acrylic Resin Varnish Production Example 10

A reaction vessel similar to the one used in Acrylic Resin Varnish Production Example 1 was charged with 100 parts of Varnish H, 29.6 parts of copper acetate, and 12.6 parts of pivalic acid, and the reaction was carried out in otherwise the same manner as in Acrylic Resin Varnish Production Example 2 to give Varnish 10 having a nonvolatile fraction of 45.2%.

Acrylic Resin Varnish Production Example 11

Varnish I obtained in Resin Varnish Production Example 9 was used as it was as Varnish 11.

EXAMPLES 1~11 AND COMPARATIVE EXAMPLES 1~3

Varnishes 1~11 obtained in Acrylic Resin Varnish Production Examples 1~11 and other ingredients indicated in Table 2 were respectively admixed using a high-speed Disper to prepare coating compositions and each composition was evaluated for long-term antifouling performance and coating film condition according to the following evaluation methods. The evaluation results are presented in Table 3. The antifoulants indicated in Table 2 were the following compounds; the acrylic resin was "Paraloid B-66" (product of Rohm & Haas Co.); and the antisagging agent was "Disparlon A 630-20X" (product of Kusumoto Kasei).

Antifoulant 1: ZPT (pyrithione zinc)

Antifoulant 2: CuPT (pyrithione copper)

Antifoulant 3: Pyridine triphenylborane

Antifoulant 4: 2-Methylthio-4-t-butylamino-6-cyclopropylamino-s-triazine

Antifoulant 5: 4,5-Dichloro-2-n-octyl-3(2H)isothiazolone

Antifoulant 6: N,N-Dimethyl-N'-phenyl-(N-fluorodichloromethylthio)sulfamide

Antifoulant 7: Stearylamine-triphenylboron

Antifoulant 8: Laurylamine-triphenylboron

TABLE 2

| Unit: weight parts | Example | | | | | | | | | | | Comparative Example | | |
|---|---|---|---|---|---|---|---|---|---|---|---|---|---|---|
|  | 1 | 2 | 3 | 4 | 5 | 6 | 7 | 8 | 9 | 10 | 11 | 1 | 2 | 3 |
| Varnish 1 | 36 | — | — | — | — | — | — | — | — | — | — | — | — | — |
| Varnish 2 | — | 40 | — | — | — | — | — | — | 32 | — | — | — | — | — |
| Varnish 3 | — | — | 42 | — | — | — | — | — | — | — | — | — | — | — |
| Varnish 4 | — | — | — | 31 | — | — | — | — | — | 31 | — | — | — | — |
| Varnish 5 | — | — | — | — | 38 | — | — | — | — | — | — | — | — | — |
| Varnish 6 | — | — | — | — | — | 32 | — | — | — | — | — | — | — | — |
| Varnish 7 | — | — | — | — | — | — | 33 | — | — | — | — | — | — | — |
| Varnish 8 | — | — | — | — | — | — | — | 32 | — | — | — | — | — | — |
| Varnish 9 | — | — | — | — | — | — | — | — | — | — | 33 | — | — | — |
| Varnish 10 | — | — | — | — | — | — | — | — | — | — | — | 35 | — | — |
| Varnish 11 | — | — | — | — | — | — | — | — | — | — | — | — | 34 | 27 |
| Copper suboxide | — | — | — | 35 | — | 35 | 35 | 35 | 35 | 35 | 35 | 35 | — | 35 |
| Zinc white | 25 | 25 | 25 | 5 | 25 | 5 | 5 | 5 | 5 | 5 | 5 | 5 | 25 | 5 |
| Red iron oxide | 2 | 2 | 2 | 2 | 2 | 2 | 2 | 2 | 2 | 2 | 2 | 2 | 2 | 2 |
| Antifoulant 1 | — | — | — | 4 | — | — | — | 4 | 2 | — | — | 4 | 4 | — |
| Antifoulant 2 | 4 | 4 | 4 | — | 1 | 2 | 1 | — | 2 | 4 | 1 | — | — | 4 |
| Antifoulant 3 | 2 | — | 3 | — | 4 | — | — | — | — | — | — | — | — | — |
| Antifoulant 4 | 2 | 1 | 1 | — | — | 1 | 1 | — | — | — | 1 | — | — | — |
| Antifoulant 5 | 1 | — | — | — | — | — | 1 | — | — | — | 1 | — | 1 | — |
| Antifoulant 6 | — | 2 | — | — | — | — | — | — | — | — | — | — | — | — |
| Antifoulant 7 | — | 1 | — | — | — | — | — | — | — | — | — | — | 2 | — |
| Antifoulant 8 | — | — | — | — | — | 3 | — | — | — | — | — | — | 2 | — |
| Chlorinated paraffin | 2 | 4 | 4 | 4 | 2 | 4 | 4 | 2 | 4 | 4 | 4 | 2 | 4 | — |
| Gum rosin | 4 | — | — | — | — | — | — | — | — | — | — | — | — | — |
| Wood rosin | — | 4 | — | — | — | — | — | — | — | — | — | 4 | — | — |
| Hydrogenated gum rosin | — | — | 4 | — | — | — | — | — | — | — | — | — | — | — |
| Rosin ester | — | — | — | 2 | — | — | 2 | — | — | — | 2 | — | — | — |
| Gum rosin-zinc | — | — | — | — | 4 | — | — | — | — | — | — | — | 4 | — |
| Acrylic resin | 5 | 5 | 5 | — | 5 | — | — | 2 | — | — | — | 2 | 5 | — |
| Antisagging agent | 2 | 2 | 2 | 2 | 2 | 2 | 2 | 2 | 2 | 2 | 2 | 2 | 2 | 2 |
| Methyl isobutyl ketone | — | 3 | 3 | 3 | — | 3 | — | 3 | — | 3 | — | 3 | 3 | 3 |
| Xylene | 15 | 7 | 5 | 12 | 17 | 11 | 14 | 13 | 16 | 14 | 14 | 6 | 12 | 22 |
| Total | 100 | 100 | 100 | 100 | 100 | 100 | 100 | 100 | 100 | 100 | 100 | 100 | 100 | 100 |

Evaluation

Polishing Rate

Each of the above coating compositions was coated in a dry coating film thickness of 300 μm on a blast sheet precoated with a rust-preventive coating and allowed to stand for drying in a room two overnights to prepare a testpiece. This testpiece was attached to the lateral surface of a cylinder measuring 750 mm in diameter and 1,200 mm long and rotated in seawater at a peripheral speed of 15 knots for 24 consecutive months. At 3-month intervals, the coating film consumption (μm, total) of the testpiece was measured.

Coating Film Condition

The testpiece after 6 months of exposure under the above conditions was visually observed to evaluate the condition of the coating film. The results are presented in Table 3.

Long-term Antifouling Performance

The testpiece after the above observation of the coating film was subjected to a marine life deposition test using an experimental raft at the Coastal Research Laboratories of Nippon Paint Co. in Tamano City, Okayama Prefecture. The results are presented in Table 3.

In Table 3, the number of months represents the duration of immersion from the raft and the numerical figure represents the percentage of deposited life relative to the coating film area.

TABLE 3

| | | Example | | | | | | | | | | | Comparative Example | | |
|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 |
| Coating film consumption (μm) | 0 months | 0 | 0 | 0 | 0 | 0 | 0 | 0 | 0 | 0 | 0 | 0 | 0 | 0 | 0 |
| | 3 months | 21 | 18 | 10 | 23 | 12 | 15 | 10 | 33 | 7 | 20 | 5 | 46 | 0 | 0 |
| | 6 months | 42 | 40 | 30 | 50 | 35 | 32 | 25 | 68 | 20 | 48 | 17 | 90 | 3 | 5 |
| | 9 months | 63 | 52 | 35 | 68 | 48 | 47 | 37 | 99 | 30 | 70 | 25 | 125 | 14 | 8 |

TABLE 3-continued

|  |  | Example |  |  |  |  |  |  |  |  |  |  | Comparative Example |  |  |
|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 |
|  | 12 months | 83 | 74 | 52 | 98 | 63 | 58 | 50 | 125 | 42 | 87 | 32 | 148 | 50 | 13 |
|  | 15 months | 102 | 93 | 70 | 123 | 80 | 78 | 63 | 148 | 50 | 105 | 34 | 160 | 115 | 16 |
|  | 18 months | 130 | 113 | 87 | 143 | 99 | 92 | 75 | 165 | 62 | 123 | 36 | 168 | 230 | 19 |
|  | 21 months | 152 | 130 | 100 | 160 | 112 | 108 | 84 | 179 | 73 | 136 | 37 | 172 | — | 23 |
|  | 24 months | 170 | 145 | 115 | 178 | 129 | 120 | 98 | 188 | 85 | 154 | 38 | 175 | — | 25 |
| Long-term antifouling performance | 3 months | 0 | 0 | 0 | 0 | 0 | 0 | 0 | 0 | 0 | 0 | 0 | 0 | 0 | 0 |
|  | 6 months | 0 | 0 | 0 | 0 | 0 | 0 | 0 | 0 | 0 | 0 | 0 | 0 | 0 | 40 |
|  | 9 months | 0 | 0 | 0 | 0 | 0 | 0 | 0 | 0 | 0 | 0 | 0 | 0 | 0 | 70 |
|  | 12 months | 0 | 0 | 0 | 0 | 0 | 0 | 0 | 0 | 0 | 0 | 0 | 20 | 0 | 100 |
|  | 18 months | 0 | 0 | 0 | 0 | 0 | 0 | 0 | 0 | 0 | 0 | 0 | 50 | 0 | 100 |
|  | 24 months | 0 | 0 | 0 | 0 | 0 | 0 | 0 | 0 | 0 | 0 | 5 | 100 | 100 | 100 |
| Coating film conditions |  | Wholesome | Wholesome | Wholesome | Wholesome | Wholesome | Wholesome | Wholesome | Wholesome | Wholesome | Wholesome | Wholesome | Cracking | Wholesome | Wholesome |

It can be seen from Table 3 that each of the coatings according to Examples 1~10 retained a steady polishing rate for a long time and showed a long-term antifouling performance and a good coating film condition. The coating according to Example 11 betrayed slight fouling after 24 months but the coating film condition remained wholesome. The coating films obtained from the coatings according to Comparative Examples 1~3 were either only sparingly consumed or not consumed any longer after a certain period of time or rather excessively consumed and no reconciliation could be obtained between long-term antifouling performance and coating film condition.

What is claimed is:

1. An acrylic resin having at least one group represented by the following general formula (1):

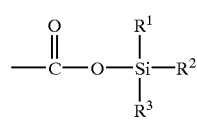

(wherein $R^1$, $R^2$ and $R^3$ may be the sales or different and each represents a hydrocarbon residue of 1 to 20 carbon atoms) in its side chain and additionally at least one group represented by the following general formula (2):

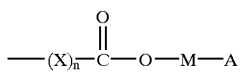

(wherein X is a group represented by the formula:

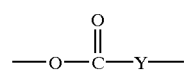

n is equal to 0 or 1; Y represents a hydrocarbon; H represents a divalent metal; and A represents a monobasic organic acid residue) in its side chain.

2. An acrylic resin characterized by its being obtainable by (A) a step which comprises polymerizing 3 to 5 weight % of a polymerizable unsaturated organic acid, 90 to 5 weight % of a triorganosilyl (meth)acrylate represented by the following general formula (3):

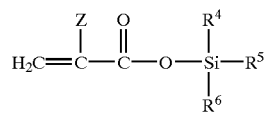 (3)

(wherein Z represents a hydrogen atom or a methyl group; $R^4$, $R^5$ and $R^6$ are the same or different and each represents a hydrocarbon residue containing 1 to 20 carbon atoms) and one or more other copolymerizable unsaturated monomer and (B) a step which comprises reacting the resin obtained in the above step (A), a metal compound, and a monobasic acid.

3. The acrylic resin according to claim 1 or 2 wherein the monobasic acid is a monobasic cyclic organic acid.

4. The acrylic resin according to claim 1 or 2 wherein the monobasic acid is at least one member selected from the group consisting of rosin, hydrogenated rosin, disproportionated rosin naphthenic acid, abietic acid, hydrogenated abietic acid, and dehydroabietic acid.

5. The acrylic resin according to claim 1 or 2 wherein $R^1$, $R^2$ and $R^3$ in general formula (1) each represents an isopropyl group.

6. The acrylic resin according to claim 1 or 2 wherein $R^4$, $R^5$ and $R^6$ in general formula (3) each represents an isopropyl groups.

7. An antifouling coating comprising the acrylic resin according to claim 1 or 2.

* * * * *

UNITED STATES PATENT AND TRADEMARK OFFICE
CERTIFICATE OF CORRECTION

PATENT NO. : 6,846,878 B2
DATED : January 25, 2005
INVENTOR(S) : Naoki Yamamori et al.

It is certified that error appears in the above-identified patent and that said Letters Patent is hereby corrected as shown below:

Column 17, line 53 through Column 20, line 15,
Claims 1-7 should read as follows:

1. An acrylic resin with a side chain, having at least one group of formula (1) in its side chain:

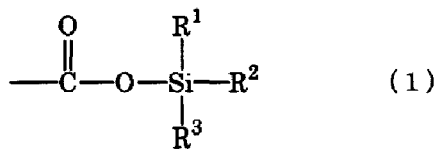

wherein $R^1$, $R^2$ and $R^3$ are the same or different, and each is a hydrocarbon group of 1 to 20 carbon atoms, and having at least one group of formula (2) in its side chain:

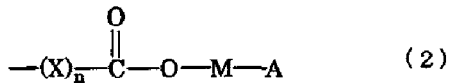

wherein X is a group of the formula:

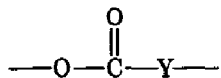

n is 0 or 1; Y is a hydrocarbon; M is a divalent metal; and A is a monobasic cyclic organic acid group, having an acid value of 100 to 220 mg KOH/g.

2. An acrylic resin produced by a process comprising performing the steps (A) and (B) of:
   (A) polymerizing 3 to 50 weight % of a polymerizable unsaturated organic acid, 90 to 5 weight % of a triorganosilyl (meth)acrylate of formula (3):

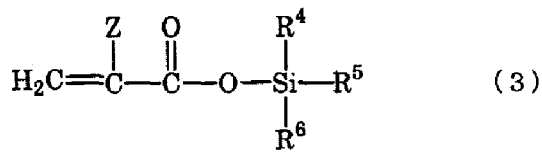

wherein Z is a hydrogen atom or a methyl group; $R^4$, $R^5$ and $R^6$ are the same or different and each is a hydrocarbon group containing 1 to 20 carbon atoms and at least one other copolymerizable unsaturated monomer; and
   (B) reacting the resin obtained in step (A) with a metal compound and a monobasic cyclic organic acid having an acid value of 100 to 220 mg KOH/g.

UNITED STATES PATENT AND TRADEMARK OFFICE
CERTIFICATE OF CORRECTION

PATENT NO. : 6,846,878 B2
DATED : January 25, 2005
INVENTOR(S) : Naoki Yamamori et al.

It is certified that error appears in the above-identified patent and that said Letters Patent is hereby corrected as shown below:

Column 17, line 53 through Column 20, line 15 (cont'd),

3. An acrylic resin with a side chain, having at least one group of formula (1) in its side chain

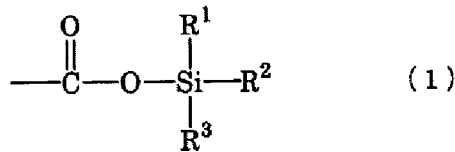     (1)

wherein $R^1$, $R^2$ and $R^3$ are the same or different and each is a hydrocarbon group of 1 to 20 carbon atoms, and having at least one group of formula (2):

     (2)

wherein X is a group of the formula:

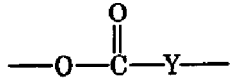

n is 0 or 1; Y is a hydrocarbon; M is a divalent metal; and A is at least one monobasic organic acid group selected from the group consisting of: rosin, hydrogenated rosin, disproportionated rosin, naphthenic acid, abietic acid, hydrogenated abietic acid, and dehydroabietic acid.

UNITED STATES PATENT AND TRADEMARK OFFICE
CERTIFICATE OF CORRECTION

PATENT NO. : 6,846,878 B2
DATED : January 25, 2005
INVENTOR(S) : Naoki Yamamori et al.

It is certified that error appears in the above-identified patent and that said Letters Patent is hereby corrected as shown below:

<u>Column 17, line 53 through Column 20, line 15 (cont'd),</u>

4. The acrylic resin according to claim 1 or 3, wherein $R^1$, $R^2$ and $R^3$ in formula (1) are each an isopropyl group.

5. The acrylic resin according to claim 2 or 3, wherein $R^4$, $R^5$ and $R^6$ in formula (3) are each an isopropyl group.

6. An antifouling coating comprising the acrylic resin according to claim 1 or 2.

Signed and Sealed this

Twelfth Day of July, 2005

JON W. DUDAS
*Director of the United States Patent and Trademark Office*